United States Patent Office 3,325,506
Patented June 13, 1967

3,325,506
BENZIMIDAZOLE SYNTHESIS AND INTER-
MEDIATES EMPLOYED THEREIN
Robert E. Jones, North Muskegon, Mich., and Victor J.
Grenda, Edison, N.J., assignors to Merck & Co., Inc.,
Rahway, N.J., a corporation of New Jersey
No Drawing. Filed Oct. 11, 1963, Ser. No. 315,677
34 Claims. (Cl. 260—302)

This invention relates generally to a novel method of synthesizing benzimidazoles. More particularly, it is concerned with a new method for preparing 2-substituted benzimidazoles. Still more particularly, it relates to a method for obtaining 2-substituted benzimidazoles from N-aryl amidines. It relates further to novel N-halo-N'-aryl amidines obtained as intermediates in this process.

This application is a continuation-in-part of our copending applications Ser. No. 124,771, filed July 18, 1961, and now abandoned and Ser. No. 216,308, filed Aug. 13, 1962, and now abandoned.

Several methods of synthesizing substituted benzimidazoles are described in the chemical literature. Although many of these are of reasonably general applicability in that they may be employed for making benzimidazoles having a wide variety of substituents at the 2-position of the benzimidazole ring, they have certain inherent disadvantages. Thus, they employ expensive and/or relatively inaccessible compounds as starting materials, they require an unduly large number of separate chemical reactions or they are not satisfactory insofar as yields are concerned. For these reasons research has continued with the object of developing new, more direct and less expensive methods of producing 2-substituted benzimidazoles. It is an object of the present invention to provide a short process which may be carried out simply, with inexpensive reagents and in good yields. An additional object of the invention is to provide novel compounds which are intermediates in the chemical synthesis. Other objects will become apparent from the ensuing description of the invention.

According to the present invention, it has now been found that 2-substituted benzimidazoles may be conveniently and readily produced from N-phenyl amidines by a process which in the overall sense comprises an oxidative cyclization of an N-phenyl amidine. This overall chemical transformation may be pictured as follows:

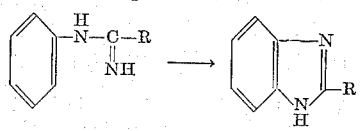

where R represents an aryl, heteroaryl, aralkyl or alkyl radical, as will be fully discussed hereinafter.

More particularly, our process comprises the reaction of an N-phenyl amidine with a positive halogenating agent to produce an N-halo-N'-phenyl amidine, and treatment of this latter substance with base to produce a 2-substituted benzimidazole:

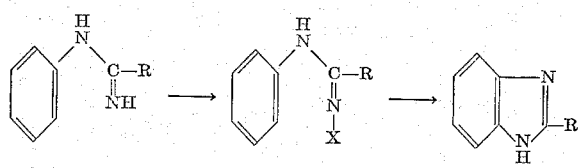

where R is an alkyl, aryl, aralkyl or heteroaromatic radical, and X is halogen, preferably a halogen having an atomic weight of between 35 and 80, i.e. chlorine or bromine.

In the first step of the synthesis, an N-phenyl amidine is reacted with a chlorinating or brominating agent to produce an N-chloro- or an N-bromo-N'-phenyl amidine.

The halogenation is brought about by reacting the amidine with a positive halogenating agent capable of halogenating the nitrogen atom of the amidine grouping. Suitable reagents for this purpose are the N-haloamides or N-haloimides having the formulas:

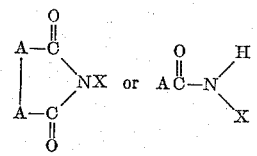

where A is an aromatic or aliphatic hydrocarbon radical preferably having from 1 to 8 carbon atoms and X is chlorine or bromine. Specific examples of this type of halogenating agent are N-chlorsuccinimide, N-bromsuccinimide, N-bromacetamide, N-chloracetamide, N-chlorpropamide and N-bromglutarimide. When an N-haloamide or N-haloimide is used, and the amidine reactant is charged as an acid addition salt, a base is employed in sufficient amount to neutralize such acid addition salt of the N-phenylamidine. For this purpose, an alkali metal carbonate or hydroxide is suitable. The reaction with the N-haloamide or N-haloimide may be conducted in an aqueous medium, or in a water-immiscible organic solvent such as benzene, toluene and the like.

A second suitable halogenating reagent is chlorine or bromine in an aqueous medium, i.e. chlorine water or bromine water. In this instance, it is desirable to charge the amidine reactant as the free base to avoid the necessity of having to neutralize an acid addition salt thereof.

The preferred halogenating agents are hypochlorous and hypobromous acid. These are conveniently formed in situ by addition of an alkali or alkaline earth metal hypohalite to a solution of the N-phenylamidine acid addition salt, whereby neutralization of the acid salt and generation of the halogenating acid occur concurrently. Typical hypohalites which may be used are sodium or potassium hypochlorite, sodium hypobromite and calcium hypochlorite. Alternatively, an aqueous solution of hypochlorous or hypobromous acid may be prepared by known methods, and such solution employed as halogenating agent after neutralization of the N-phenylamidine acid addition salt with base. It will be understood that in aqueous reaction media, hypohalite is the active halogenating agent where any of the foregoing reagents are used, and for this reason it is convenient to describe the reaction generically as effected by hypohalite.

For optimum results, at least about one mole of halogenating agent is used in the reaction with the N-phenylamidine, and up to about a 15% molar excess is satisfactory. Under preferred conditions, a 5–10% molar excess is employed. A large excess of halogenating agent is generally avoided since the likelihood of undesirable halogenation in other portions of the molecule thereby increases.

The reaction of N-phenyl amidine with chlorinating or brominating agent to form the N-halo-N'-phenyl is conveniently carried out in a suitable solvent medium at temperatures in the range of about 0° to about 40° C. and preferably at about 5° to about 30° C. The reaction proceeds rapidly and is normally complete or substantially complete in a relatively short period of time. At the preferred reaction temperatures, highly satisfactory results are obtained by permitting the halogenation to proceed for from about 5 minutes to about 1 hour.

The solvent medium is not critical and water, mixtures of water and water-miscible solvents, or water immiscible solvents may be used. In one aspect of the invention, a water-immiscible organic solvent is added to the aqueous reaction mixture, and the N-halo-N'-phenyl amidine, which is preferentially soluble in organic solvents, dissolves in the organic solvent as it is produced. Although this is not essential, and the reaction product may be recovered from the aqueous reaction mixture by other standard techniques, the presence of the organic solvent during the halogenation reaction facilitates isolation and recovery of the desired product. Examples of suitable solvents which may be employed for this purpose are diethyl ether, petroleum ether, benzene, toluene, xylene chloroform, butanol, pentanol, methylene chloride and the like. The desired N-halo-N'-phenyl amidine is then conveniently isolated and purified by removal of the organic solvent and recrystallization. Further, with non-aqueous halogenating agents, a medium consisting solely of water-immiscible organic solvent is very suitable.

Alternatively, a water-miscible organic solvent such as a lower alkanol may be added to the aqueous reaction medium in order to solubilize the amidine base and thereby facilitate the physical handling of the reaction mixture. It is preferred to conduct the reaction in an aqueous medium containing up to about 60%, and preferably 25–50% (by volume) of a lower alkanol for example methanol or ethanol. The N-halo-N'-phenyl amidine is only slightly soluble in such mediums, and precipitates as it is formed. It may be recovered by known techniques such as filtration or centrifugation, or alternatively, it may be converted directly without isolation to the 2-substituted benzimidazole.

The N-halo-N'-phenyl amidine is converted to a 2-substituted benzimidazole by treatment with a base. We employ at least 1 mole of base per mole of amidine compound although an excess of the base is not harmful and may be used if desired. The ring closure of the halo-amidine to the benzimidazole is brought about by intimately contacting the halo-amidine and the base for a short period of time. As the reaction medium it is convenient to employ water, a water-miscible organic solvent such as a lower alkanol, or an aqueous alcoholic medium such as aqueous methanol or ethanol. Cyclization of the N-haloamidine to benzimidazole takes place rapidly at room temperature or slightly above. However, to insure complete cyclization, the reaction mixture is preferably heated to a temperature of from about 40 to about 100° C. Under these preferred conditions the reaction is substantially complete in times of from about 1 minute to about 1 hour. The reaction times and temperature are not critical to the process, and benzimidazole formation can be carried out at or below room temperature as well as at elevated temperatures. As is to be expected, the reaction time will decrease as the temperature is increased.

Suitable bases which may be employed to effect cyclization of N-halo-N'-phenyl amidine to 2-substituted benzimidazole are alkali or alkaline earth metal hydroxides such as sodium hydroxide, potassium hydroxide, calcium hydroxide, organic bases such as trialkylamines, ammonium hydroxide, an alkali metal carbonate or bicarbonate, or an alkali metal cyanide. An alkali metal alkoxide or hydride such as sodium methoxide or sodium hydride may be used but in such instance the reaction medium should be an anhydrous one. The particular base is not critical, and excellent results are obtained when at least an equimolar amount of base is present (with respect to the halo-amidine). It will be appreciated by those skilled in this art that some cyclization will occur with less than an equimolar amount of base but this will lead to incomplete reaction and to a mixture of products. For best results, we prefer to employ a 10–40% molar excess of base. On completion of the reaction the 2-substituted benzimidazole may be recovered without undue difficulty. Generally, the benzimidazoles are not highly soluble in aqueous or aqueous alcoholic mediums and in most cases precipitate directly from such mediums. They may thus be recovered directly by filtration, preferably after adjustment of the pH to about 6–8. When an organic solvent is used as the reaction medium, the benzimidazole can be recovered directly in those instances where it is insoluble in the solvent. Where the desired product is soluble, it is isolated by distillative removal of solvent.

The formation of N-halo-N'-phenyl amidine by reaction of N-phenyl amidine with a halogenating agent, and the cyclization of the halo-amidine to benzimidazole in the presence of at least an equimolar amount of base are both extremely rapid reactions, and it has been found possible to effect the overall process, i.e. oxidative cyclization of amidine to benzimidazole, in one operative step. This is accomplished either (i) by contacting the N-phenyl amidine with the halogen oxidizing agent, whereupon the N-halo amidine begins to form almost immediately, and immediately adding at least an equimolar amount of base to the reaction medium, or (ii) by treating the N-phenyl amidine with the halogen containing oxidizing agent in the presence of at least an equimolar amount of base. In either modification of this aspect of our invention, the N-halo-N'-phenyl amidine is not recovered, but rather is cyclized immediately to the benzimidazole. The preferred reaction conditions are essentially the same as those previously set forth for cyclization of the N-halo amidine, i.e. heating at about 40–100° C. for periods of up to about 1 hour. The 2-substituted benzimidazole is recovered as before. This method may be operated batchwise, or adapted to a continuous process in which the reactants are mixed in one vessel, and the resulting mixture passed through succeeding vessels maintained at higher temperatures. The flow rate through such vessels is adjusted to give the desired overall reaction time.

The oxidative cyclization processes of this invention are applicable generally to the synthesis of 2-substituted benzimidazoles from N-phenyl amidines. Thus, they are useful in making:

(1) 2-aryl benzimidazoles, where the aryl radical may be phenyl, naphthyl or substituted phenyl and naphthyl radicals examples of which are halophenyl tolyl, alkoxyphenyl, nitrophenyl, and halonaphthyl, from the corresponding N-phenyl-aryl amidine;

(2) Benzimidazoles wherein the 2-substituent is a heterocyclic radical, and particularly a heteroaromatic radical, such as pyridyl, pyrimidyl, thienyl, furyl, pyrryl, oxazolyl, thiazolyl, thiadiazolyl, isothiazolyl, pyrazolyl, pyrazinyl, quinolinyl, or imidazolyl, from the corresponding N-phenyl heteroaromatic amidine;

(3) 2-aralkyl benzimidazoles from N-phenyl aralkyl amidines, examples of aralkyl groups being benzyl, phenethyl and phenylpropyl;

(4) 2-alkyl benzimidazoles, and preferably 2-loweralkyl benzimidazoles such as the 2-methyl, ethyl, propyl, butyl, amyl and the like from the corresponding N-phenyl alkylamidines.

The process of the invention is applicable to the preparation of 2-substituted benzimidazoles which are further substituted in the six-membered ring of the benzimidazole nucleus, that is, at positions 4, 5, 6 and/or 7 of the nucleus. For making such compounds, the appropriate N-substituted phenyl amidine is employed as starting material for the oxidative cyclization process. In terms of yield of desired benzimidazole, best results are obtained when the substituent in the phenyl radical of the starting amidine is one that does not greatly influence the electron density of the phenyl ring, e.g. alkyl, aryl, halogen. The oxidative cyclization occurs, although sometimes in lower yields, when the phenyl ring contains electron-withdrawing or electron-donating substituents. Thus, the nature of the substituent is not critical to our process.

Our cyclization process is particularly well suited for the synthesis of 2-heteroaromatic and 2-aryl benzimidazoles. Of particular importance is the synthesis, from the corresponding N-phenyl amidines, of benzimidazoles having a five-membered heteroaromatic ring at the 2-position, where the hetero ring contains at least 2 carbon atoms and where the hetero ring atoms are sulfur, nitrogen and/or oxygen. Of these, the preparation of 2-thiazolyl benzimidazoles are especially preferred inasmuch as extremely high yields of such products are obtained by the treatment of N-phenyl(thiazole-amidine) with a halogen containing oxidizing agent, and contacting the resulting N-halo-N'-phenyl(thiazole-amidine) with a base.

Representative examples of 2-heteroaromatic and 2-aryl benzimidazoles which are conveniently prepared according to the process of this invention are 2-(2'-thiazolyl)-benzimidazole,
2-(4'-thiazolyl)-benzimidazole,
2-(4'-isothiazolyl)-benzimidazole,
2-(5'-thiazolyl)-5-phenyl-benzimidazole,
2-(4'-thiazolyl)-5,6-dimethyl benzimidazole,
2(2'-thiazolyl)-5-methoxy benzimidazole,
2-[3'-(1',2',5'-thiadiazolyl)]-benzimidazole,
2-(2'-furyl)-benzimidazole,
2-(3'-thienyl)-benzimidazole,
2-(2'-pyrryl)-benzimidazole,
2-(2'-thiazolyl)-benzimidazole,
2-(4'-thiazolyl)-benzimidazole,
2-(3'-pyridyl)-5-fluoro benzimidazole,
2-(1'-pyrazolyl)-benzimidazole,
2-(2'-pyrazinyl)-benzimidazole,
2-phenyl benzimidazole,
2-(o-fluorophenyl)-benzimidazole and 2-naphthyl benzimidazole,
2-(phenethyl)-5-chlorobenzimidazole and 2-(benzyl)-5-methylbenzimidazole.

In addition, bibenzimidazoles of the type structure

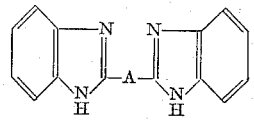

where A is phenyl or —CH$_2$CH$_2$— are readily prepared by this process, such compounds being themselves useful as optical bleaching agents or as intermediates in making such agents.

Although the foregoing description of our invention relates to synthesis of benzimidazoles from N-phenyl (or substituted phenyl) amidines, the invention also includes the cyclization of other N-aromatic amidines such as N-pyridyl and N-naphthyl amidines to the corresponding azabenzimidazoles and naphthimidazoles.

According to an additional aspect of the invention, the N-halo-N'-phenylamidines described above may be converted to 2-substituted benzimidazoles by exposure to ultraviolet light. This is brought about by exposing a solution or suspension of the N-halo-N'-phenylamidine in an organic solvent to irradiation with ultraviolet light. The light source is not critical and may be one of the commercially available ultraviolet lamps. The irradiation is conducted in a closed system for from about ½ to 10 hours.

The 2-substituted benzimidazoles produced according to the processes described hereinabove have a variety of known uses. Those wherein the 2-substituent is an aryl or heteroaromatic radical are active anthelmintic agents and are useful for the effective treatment and prevention of helminthiasis in domesticated animals such as sheep, goats, cattle, horses and swine. For this purpose, they are orally administered to the animals in the form of a drench or bolus, or in the feed of the animals to be treated. The 2-alkyl and aralkyl benzimidazoles have several reported uses, one of which is as antimetabolites.

The following examples are given for the purpose of illustration and not by way of limitation.

*Example 1*

35 ml. of diethyl ether is added to a stirred solution of 5.0 g. (20.8 millimoles) of N-phenyl(thiazole-4-amidine)hydrochloride in 46 ml. of water. The resulting mixture is cooled to between 0–10° C. and then 7.31 ml. of 2.85 N sodium hypochlorite (20.8 millimoles) is added thereto over a period of about 2 minutes. Stirring is continued for an additional 10 minutes. The solvent layers are allowed to separate and the ethereal layer is removed, washed with water and dried over calcium chloride. It is then filtered and concentrated to dryness in vacuo to give a dark solid material. This substance is recrystallized from ethanol-petroleum ether to give substantially pure N-chloro-N'-phenyl(thiazole-4-amidine), M.P. 96–98° C.

When N-bromsuccinimide is reacted with N-phenyl (thiazole-2-amidine)hydrochloride or N-phenyl(thiazole-4-amidine)hydrochloride in the presence of 20.8 millimoles of potassium carbonate (in aqueous solution) according to the above process, there is obtained N-bromo-N'-phenyl(thiazole-2-amidine) or N-bromo-N'-phenyl (thiazole-4-amidine), respectively.

In similar fashion, N-chloro-N'-phenyl(1,2,3-thiadiazole-4-amidine), N-chloro-N'-3-methoxyphenyl(thiazole-4-amidine) and N-chloro-N'-phenyl(isothiazole-4-amidine) are obtained by treatment of N-phenyl(1,2,3-thiadiazole - 4 - amidine)hydrochloride, N - 3 - methoxyphenyl(thiazole-4-amidine)hydrochloride and N-phenyl(isothiazole-4-amidine)hydrochloride, respectively, with sodium hypochlorite.

*Example 2*

To a stirred solution of 1.0 g. of N-chloro-N'-phenyl (thiazole-4-amidine) in 25 ml. of ethanol there is added 278 mg. of potassium hydroxide (85% pure) in 10 ml. of ethanol. The resulting solution is refluxed for about 1 minute (or until a negative potassium iodide-starch test is obtained). Sufficient water is then added to dissolve the solid potassium chloride and the pH of the solution adjusted to 6 with hydrochloric acid. 2-(4'-thiazolyl)-benzimidazole crystallizes. The product is recovered by filtration and washed with a small amount of cold ethanol, M.P. 298–300° C.

When N - bromo - N' - phenyl(thiazole - 2 - amidine) is treated according to the above process with an equimolar amount of sodium hydoxide, 2-(2'-thiazolyl)-benzimidazole, M.P. 245–246° C.

Treatment of N-chloro-N'-phenyl(1,2,3-thiadiazole-4-amidine), N - chloro - N' - 3 - methoxyphenyl(thiazole-4-amidine) and N-chloro-N'-phenyl(isothiazole-4-amidine) with ethanolic sodium hydroxide or potassium hydroxide by the above process yields, respectively, 2-[4'-(1',2',3' - thiadiazolyl)] - benzimidazole, 2 - (4' - thiazolyl)-5-methoxy-benzimidazole and 2-(4'-isothiazolyl)-benzimidazole.

*Example 3*

To a solution of 4.67 g. (19.5 millimoles) of N-phenyl (thiazole-4-amidine)hydrochloride in 22.2 ml. of water (pH 4.5), there is added, with stirring, 22 ml. of methanol and 7.23 ml. of 2.7 M sodium hypochlorite (19.5 millimoles). N-chloro-N'-phenyl(thiazole-4-amidine) crystallizes almost immediately, and the temperature rises from 27° C. to about 37° C. The suspension is stirred for 3 minutes, and then a solution of 0.94 g. (23.5 millimoles) of sodium hydroxide in 2 ml. of water is added. The mixture is heated to reflux (77–79° C.) during which time solid 2-(4'-thiazolyl)-benzimidazole separates. Refluxing is continued for 10 minutes, and then the mixture cooled to room temperature, and the pH adjusted to 6–7 with hydrochloric acid. The solid 2-(4'-thiazolyl)-benzimidazole is recovered by filtration, washed with water and dried in vacuo to give 3.52 g. of product, M.P. 300–302° C.

*Example 4*

3.85 ml. of 2.86 M aqueous sodium hypochlorite (11 millimoles) is added at about 10° C. to a stirred solution of 2.64 g. (11 millimoles) of N-phenyl(thiazole-2-amidine)hydrochloride in 20 ml. of water and 20 ml. of methylene chloride, over a period of 8 minutes. The reaction mixture is then stirred for 10 minutes after which time the layers are allowed to separate and the methylene chloride layer removed. The aqueous layer is extracted time the layers are allowed to separate and the methylene chloride extracts are combined, dried over sodium sulfate, and concentrated to dryness to give substantially pure N-chloro-N'-phenyl(thiazole-2-amidine).

*Example 5*

To a stirred solution of 10 g. (41.6 millimoles) of N-phenyl(thiazole-4-amidine)hydrochloride in 50 ml. of water and 60 ml. of methanol there is added 9.7 g. (91.6 millimoles) of sodium carbonate in 25 ml. of water, after which 3.0 g. of gaseous chlorine is added at room temperature. An additional 4.4 g. (41.6 millimoles) of sodium carbonate is then added and the mixture refluxed for 15 minutes. 2-(4'-thiazolyl)-benzimidazole precipitates. The suspension is cooled, adjusted to pH 7 with concentrated hydrochloric acid, and the solid 2-(4'-thiazolyl)-benzimidazole recovered by filtration.

*Example 6*

To a solution of 1 g. (4.96 millimoles) of N-phenyl-(thiazole-4-amidine) in 10 ml. of water and 10 ml. of methanol there is added with stirring 1.73 ml. of 2.87 M sodium hypochlorite (4.96 millimoles). The reaction mixture is refluxed for 20 minutes. It is then cooled to room temperature and the solid removed by filtration. The solid thus obtained is substantially pure 2-(4'-thiazolyl)-benzimidazole.

*Example 7*

To a solution of 10 g. (41.7 millimoles) of N-phenyl-(thiazole-4-amidine) hydrochloride in 60 ml. of water and 60 ml. of methanol there is added, with stirring, 14.8 ml. of 2.88 M sodium hypochlorite followed by 5.75 g. (54.3 millimoles) of sodium carbonate. The reaction mixture is refluxed for 15 minutes and then cooled to room temperature. The pH is adjusted to 8 with concentrated hydrochloric acid. The solid 2-(4'-thiazolyl)-benzimidazole is collected on a funnel, washed several times with water and dried at 90–100° C. 8.2 g. of product are obtained, M.P. 296–297° C.

Similar results are obtained by using sodium hydroxide as the base instead of sodium carbonate.

*Example 8*

To 50 ml. of stirred aqueous solution containing 6.65 g. (27.7 millimodes) of N-phenyl(thiazole-2-amidine) hydrochloride there is added 50 ml. of methanol, followed by 10.1 ml. of 2.88 M sodium hypochlorite and 2.82 g. of sodium bicarbonate as a saturated aqueous solution. The reaction is refluxed for 45 minutes, cooled to room temperature, and the solid 2-(2'-thiazolyl)-benzimidazole collected by filtration.

*Example 9*

To a suspension of 5.00 g. (21.1 millimoles) of N-chloro-N'-phenyl(thiazole-4-amidine) in 60 ml. of 50% aqueous methanol there is added 3.5 ml. of concentrated ammonium hydroxide (25.3 millimoles). The reaction mixture is refluxed for 15 minutes, after which time the pH is adjusted to 6 with hydrochloric acid. 2-(4'-thiazolyl)-benzimidazole is present as a solid. The suspension is filtered and the solid 2-(4'-thiazolyl)-benzimidazole dried in vacuo.

When this process is repeated with N-chloro-N'-phenyl-(thiazole-2-amidine) and an equimolar amount of triethylamine (in place of ammonium hydroxide), 2-(2'-thiazolyl)-benzimidazole is obtained.

*Example 10*

1.36 g. (21.1 millimoles) of potassium cyanide is added to a stirred suspension of 5.00 g. (21.1 millimoles) of N-chloro-N'-phenyl(thiazole-4-amidine) in 60 ml. of 50% aqueous methanol. The mixture is refluxed for two hours and then cooled to room temperature. The solid 2-(4'-thiazolyl)-benzimidazole is collected by filtration, washed with water and dried in vacuo to afford substantially pure material.

*Example 11*

To a stirred solution of 10 g. of N-phenylbenzamidine hydrochloride in 50 ml. of distilled water, there is added 60 ml. of diethyl ether. The mixture is cooled to between 0–10° C. and 15.1 ml. of 2.85 N sodium hypochlorite added over 2–3 minutes. After 10 minutes of additional stirring, the ether layer is removed, washed with water, and dried over CaCl$_2$. Filtration and concentration affords a solid which is recrystallized from methylene chloride-petroleum ether to give substantially pure N-chloro-N'-phenylbenzamidine, M.P. 130–131.5° C.

To a warm solution (30–40° C.) of 500 mg. of N-chloro-N'-phenylbenzamidine in 10 ml. of absolute ethanol there is added with stirring 143 mg. of potassium hydroxide (85% purity) as a solution in 5 ml. of absolute alcohol. The mixture is heated to reflux for about 30 seconds and cooled to room temperature. The solid is removed by filtration and the filtrate concentrated in vacuo to a crystalline tan solid, M.P. 288–292° C. It is recrystallized from benzene to give substantially pure 2-phenylbenzimidazole, M.P. 296–297.5° C.

*Example 12*

To a solution of 5.6 g. of N-phenyl-(2-chylorobenzamidine)hydrochloride in 50 ml. of water and 50 ml. of methanol there is added 11.8 ml. of 2.8 M sodium hypochlorite. 3.8 g. of sodium carbonate is then added, with stirring. This reaction mixture is refluxed for about 10 minutes and then cooled to room temperature. The solid which separates is collected by filtration, washed with 50% aqueous methanol, and then dried to give 2-(2'-chlorophenyl)benzimidazole, M.P. 230–231° C.

*Example 13*

50 ml. of water containing 3.15 g. (21 millimoles) of N-phenyl(2-fluorobenzamidine)hydrochloride is diluted with 50 ml. of methanol and treated with 7.2 ml. of 2.91 M sodium hypochlorite at room temperature. After stirring for about 15 minutes, the separated N-chloro-N'-phenyl(2-fluorobenzamidine) is collected by filtration and washed with aqueous methanol.

A suspension of 4.00 g. (16 millimoles) of N-chloro-N'-phenyl(2-fluorobenzamidine) in 60 ml. of 50% aqueous methanol is treated with 0.72 g. (18 millimoles) of sodium hydroxide, with stirring. The reaction mixture is refluxed for five minutes and cooled to room temperature. The solid 2-(2'-fluorophenyl)-benzimidazole is recovered by filtration, M.P. 201–202° C.

*Example 14*

To 65 ml. of aqueous solution containing 6 g. (20 millimoles) of N-phenyl(naphthalene-2-amidine)hydrochloride there is added with stirring 80 ml. of methanol. To this solution there is added an oxidizing mixture consisting of 1.42 g. (20 millimoles) of chlorine and 6.36 g. (60 millimoles) of sodium carbonate in 25 ml. of water. The reaction mixture is refluxed until the potassium iodide-starch test is negative, then cooled to room temperature, and the solid product collected by filtration. The solid is washed with aqueous methanol and dried in vacuum to yield 2-(2'-naphthyl)benzimidazole, M.P. 219–221° C.

*Example 15*

5.00 g. (18.6 millimoles) of N(p-methoxyphenyl)thiazole-4-amidine hydrochloride in 20 ml. of water and 20 ml. of methanol is mixed with 18.6 millimoles of sodium hypochlorite. A solution of 0.94 g. of sodium hydroxide in 2 ml. of water is added, and the reaction mass refluxed for one hour. It is then cooled to room temperature and adjusted to pH 6–7 with concentrated hydrochloric acid. The solid 2-(4-thiazolyl)-5-methoxybenzimidazole is recovered by filtration and dissolved in hydrochloric acid solution. The resulting solution is treated with decolorizing charcoal, the charcoal then filtered off and the filtrate neutralized with aqueous sodium hydroxide. 2-(4-thiazolyl)-5-methoxybenzimidazole precipitates and is recovered by filtration.

Example 16

39.0 g. of aluminum chloride is added to a rapidly stirred solution of 60 g. of 4-aminobiphenyl and 33.0 g. of 4-cyanothiazole in 700 ml. of dry tetrachloroethane. The mixture is heated with stirring to reflux over 15 minutes in an oil bath (at 140–160° C.) and refluxed gently with stirring for 35 minutes. It is then cooled to room temperature over 15 minutes and then to −5° C. in an ice bath with stirring for 30 minutes. A dark brown insoluble gum forms. The cold supernatant liquid is decanted and the residue washed with a small amount of tetrachloroethane, and then dissolved in 600 ml. of methanol by stirring at room temperature for 30 minutes. The methanolic solution is filtered and poured slowly into an ice cold solution of 300 g. of sodium hydroxide in 4500 ml. of water. The resulting 3-phase system is extracted with 3× 500 ml. of methylene chloride. The combined extracts are washed with water, dried over anhydrous potassium carbonate, treated with "activated charcoal," filtered and concentrated in vacuo to give about 64 g. of N-(p-biphenylyl)-thiazole - 4 - amide. Recrystallization from methylene chloride-ether yields substantially pure amidine, M.P. 177–180° C.

To a stirred slurry of 103.5 g. of the above amidine in 600 ml. of methanol there is added 31 ml. of concentrated hydrochloric acid, followed by 500 ml. of methylene chloride. The resulting solution is cooled to room temperature, and over a period of 30 minutes with rapid stirring 120.5 ml. of 3.08 molar sodium hypochlorite was added. Stirring is continued at room temperature for an additional 45 minutes and then, under gentle reflux with rapid stirring, 25 g. of solid potassium hydroxide is added portionwise over 30 minutes. After refluxing an additional 45 minutes the reaction mixture is cooled, diluted with 1000 ml. of water, and neutralized with concentrated hydrochloric acid. The resulting mixture is extracted with 3× 600 ml. of methylene chloride. The organic extracts are combined and dried over $Na_2SO_4$. The solution is filtered and concentrated in vacuo to give 82 g. of 2-(4'-thiazolyl)-5-phenyl benzimidazole. Recrystallization from hot ethyl acetate affords substantially pure material, M.P. 210–218° C.

Example 17

A suspension of one gram (5-millimoles) of N-phenyl (thiazole-4-amidine), free base, and 0.74 g. (5.5 millimoles) of N-chlorosuccinimide in 14 ml. of benzene is heated at reflux temperature for 2 hours. During this period the reactants dissolve and succinimide precipitates. The succinimide is then removed by filtration and N-chloro-N'-phenyl(thiazole-4-amidine) obtained by concentration of the benzene filtrate. The amidine thus obtained is dissolved in methylene chloride and the solution extracted with water to remove succinimide. The methylene chloride layer is dried over sodium sulfate, filtered and concentrated to a small volume. Cyclohexane is added slowly to the methylene chloride solution until crystallization of amidine begins. The crystalline N-chloro-N'-phenyl(thiazole-4-amidine) thus obtained is recovered by filtration and dried, M.P. 97–98° C. (84% yield in two crops).

Example 18

1.34 g. (10 millimoles) of N-phenylacetamidine hydrochloride is added to a solution of 10 ml. of water and 10 ml. of methanol. 4 ml. of 2.7 M sodium hypochlorite is added to the amidine and the mixture stirred at ambient temperature for about five minutes during which time N-chloro-N'-phenylacetamidine is formed. A solution of 0.47 g. of sodium hydroxide in 1.5 ml. of water is then added and the resulting mixture refluxed for 15 minutes. The reaction mixture is then cooled to room temperature and concentrated in vacuo to a small volume. The pH is adjusted with hydrochloric acid to 6–7. 2-methylbenzimidazole precipitates and is recovered by filtration, M.P. 173–176° C.

Example 19

When the process of Example 4 is carried out employing 2.6 g. of N-phenyl phenylacetamidine hydrochloride as the starting material, N-chloro-N'-phenyl(phenylacetamidine) is produced. This material is converted to 2-benzylbenzimidazole by treatment with aqueous sodium carbonate in aqueous methanol following the procedure of Example 13.

Example 20

A mixture of 4.1 gm. (0.02 mole) of 4-amino-4'-chlorobiphenyl, 2.2 gm. (0.02 mole) of 4-cyanothiazole and 2.7 gm. (0.02 mole) of anhydrous aluminum chloride in 50 ml. of tetrachloroethane is stirred and refluxed for 20 minutes and then allowed to cool. The solvent is decanted and the gummy residue dissolved in 60–70 ml. of methanol. The solution is added to 20 gm. of sodium hydroxide in 300 ml. of water. N-(4-chlorobiphenyl)-(thiazole-4-amidine) precipitates, and is recovered by filtration, M.P. 188–191° C.

A suspension of 1.37 gm. (0.0043 mole) of N-(4'-chlorobiphenyl)-(thiazole-4-amidine) in 50 ml. of methanol is adjusted to pH 3.5 with concentrated hydrochloric acid. To the resulting solution there is added 1.6 ml. (0.0043 mole) of 2.8 M sodium hypochlorite. The mixture is allowed to stand for 3 minutes at room temperature during which time N-chloro-N'-(4'-chlorobiphenyl)-(thiazole-4-amidine) begins to precipitate. 0.3 g. of sodium hydroxide in 1 ml. of water is added and the mixture refluxed for 10 minutes, cooled and acidified to about pH 4 with hydrochloric acid. It is heated to reflux and a small amount of gummy material removed by filtration. The filtrate, on being cooled, deposits 1.35 gm. of 5-(4'-chlorophenyl)-2-(4' - thiazolyl) - benzimidazole hydrochloride, M.P. >250° C.

Example 21

A mixture of 1.1 gm. (0.07 mole) of p-fluoroaniline, 1.1 gm. (0.07 mole) of 4-cyanothiazole, 1.33 gm. (0.07 mole) of anhydrous aluminum chloride in 11 ml. of tetrachloroethane is stirred and refluxed for 20 minutes. The supernatant liquid is then decanted, the residue dissolved in 25 ml. of methanol and the methanol solution added to 50 ml. of 5 N sodium hydroxide. About 200 ml. of water is added and the mixture extracted with 3× 90 ml. of ether. The ether extracts are combined, dried, and concentrated to dryness to give a residue of N-p-fluorophenyl-(thiazole-4-amidine), M.P. 100–102° C. Recrystallization from ethanol-water (1:2) yields pure material, M.P. 103.5–104.5° C.

A suspension of 4.4 gm. of N-p-fluorophenyl (thiazole-4-amidine) in 25 ml. of methanol and 25 ml. of water is adjusted to pH 4.5 by the addition of concentrated hydrochloric acid. To the solution is added 7.3 ml. (1 equivalent) of 2.8 M sodium hypochlorite. After 3 minutes at room temperature a solution of 1 gm. of sodium hydroxide in 4 ml. of water is added, and the mixture refluxed for 10 minutes. 2-(4'-thiazolyl)-5-fluorobenzimidazole begins to precipitate as a light colored solid. The mixture is cooled, and filtered, and the solid dried to give 3.5 gm. of 5-fluoro-2-(4'-thiazolyl)-benzimidazole, M.P. 251–253° C.

Example 22

To a suspension of 6.65 g. (50.0 millimoles) of aluminum chloride in 25 ml. of sym-tetrachloroethane there is added 5.00 g. (45.4 millimoles) of 4-cyanothiazole with stirring, followed by a suspension of 5.60 g. (45.4 millimoles), of p-nitroaniline in 25 ml. of sym-tetrachloroethane. The reaction is refluxed for 25 minutes, after which time the aluminum complex is decomposed by treating the reaction mixture with 13.6 g. of sodium hydroxide in 40 ml. of water with vigorous stirring at room temperature. The organic layer is separated, washed with water, and decolorized with activated charcoal. It is then dried, filtered, and the filtrate saturated with hydrogen chloride. N-(p-nitrophenyl) thiazole-4-amidine hydrochloride crystallizes and is recovered by filtering. On recrystallization from ethanol it melts at 256–260° C.

To a mixture of 4.0 g. (14.1 millimoles) of N-(p-nitrophenyl)thiazole-4-amidine hydrochloride in 50 ml. of water and 50 ml. of methylene chloride there is added 4.8 ml. of 2.95 M sodium hypochlorite with stirring. After 5 minutes the methylene chloride layer is separated, washed with water, and dried. It is filtered and concentrated to dryness to give N-chloro-N'-(p-nitrophenyl)thiazole-4-amidine, M.P. 157–158° C. after recrystallization from benzene.

1 g. (3.53 millimoles) of N-chloro-N'-(p-nitrophenyl) thiazole-4-amidine is mixed with 5.2 ml. of 0.68 N alcoholic potassium hydroxide solution with stirring. The mixture is heated to reflux for about 10 minutes, cooled to room temperature and filtered. The solid is washed thoroughly with water and air dried to give 2-(4'-thiazolyl)-5-nitrobenzimidazole. On recrystallization from methanol the product melts at 247–249° C. The product, along with precipitated potassium chloride, was collected on a funnel and washed with water to extract the salt from the crude benzimidazole.

*Example 23*

To 10 ml. of tetrachloroethane is added 1.37 gm. (7.78 mmole) of 4-(p-aminophenyl)thiazole and 0.80 gm. (7.78 mmole) of 4-cyanothiazole. To the stirred solution is added 1.04 gm. of aluminum chloride and the resulting solution is stirred at reflux for 1 hour. The mixture is cooled to room temperature and the solvent is decanted. The residue is dissolved in 20 ml. of methyl alcohol and the solution added to 100 ml. of 4 NaOH with stirring. The resulting precipitate of N-[p-(4'-thiazolyl)phenyl] (thiazole-4-amidine) is filtered and the solid washed with water to give 1.97 gm. of amidine which, upon double recrystallization from ethanol-water, has M.P. 157–158° C.

4 gm. of this amidine in 25 ml. of methyl alcohol is adjusted to pH 4.5 with concentrated HCl, and 5 ml. of 1 N sodium hypochlorite added to the solution. The resulting mixture is stirred for 5 minutes; 60 gm. of sodium hydroxide is then added and the mixture heated at reflux for 45 minutes. The mixture is cooled and concentrated to dryness in vacuo. The residue is dissolved in 15% hydrogen chloride and the mixture neutralized with concentrated ammonium hydroxide. 2-(4'-thiazolyl)-5-(4'-thiazolyl)benzimidazole precipitates and is recovered by filtration, M.P. 135–140° C.

The new and novel 5-substituted benzimidazoles of Examples 20 through 23, the synthesis of which by the process of our invention is described in those examples, are useful anthelmintic agents. They are the inventions of our colleagues Lewis H. Sarett and Horace D. Brown and are to be claimed in patent application filed by them.

*Example 24*

A. A solution of 180 mgs. (0.78 millimole) of N-chloro-N'-phenylbenzamidine in 10 ml. of benzene in a quartz tube is exposed to ultraviolet radiation for 2¼ hours at a temperature of 40–50° C. At the end of this time the solid product is collected by filtration and dried to remove residual hydrogen chloride. After drying of the solid, the residue consists of 50 mgs. of 2-phenyl benzimidazole.

B. 36 mgs. of N-chloro-N'-phenyl(thiazole-4-amidine) in 2 ml. of benzene is treated with ultraviolet radiation for 90 minutes at a temperature of 35–45° C. 2-(4'-thiazolyl)benzimidazole hydrochloride crystallizes and is recovered by filtration.

*Example 25*

To a stirred solution of 10 g. (41.7 millimoles) of N-phenyl(thiazole-4-amidine)hydrochloride in 120 ml. of 50% aqueous methanol there is added at room temperature 14.5 ml. of 2.88 M sodium hypochlorite (41.7 millimoles) to yield a suspension of N - chloro-N'-phenyl (thiazole-4-amidine). After about 5 minutes of continued stirring, 5.75 g. (54.3 millimoles) of sodium carbonate is added as a saturated solution and the mixture refluxed for 20 minutes. The suspension is then cooled to room temperature and the pH adjusted to 6 with dilute hydrochloric acid. 2-(4'-thiazolyl)benzimidazole precipitates, and is collected by filtration and washed well with water. It is dried in vacuum to give 8.2 g. of product, M.P. 296–297° C. Recrystallization by dissolving the product in hot dilute hydrochloric acid and adjusting the pH of the hot solution to 6 with dilute ammonium hydroxide yields substantially pure material, M.P. 301–302° C.

Similar results are obtained by adding the sodium hypochlorite and the sodium carbonate simultaneously to the amidine solution and refluxing for 20 minutes.

*Example 26*

To a solution of 100 g. (0.908 mole) of 4-cyanothiazole in 300 ml. of anhydrous methanol there is added with stirring a solution of 5.47 g. (0.101 mole) of sodium methoxide in 100 ml. of methanol. The solution is stirred for 17 hours at room temperature, after which time the catalyst is neutralized by the addition of 6.08 g. (0.101 mole) of glacial acetic acid. The reaction mixture is concentrated in vacuo to a crystalline mass and methyl thiazole-4-carboximidate extracted with methylene chloride. The carboximidate hydrochloride is crystallized from one liter of methylene chloride containing the free base by the addition of 99 ml. of 8.96 N methanolic hydrogen chloride, M.P. 151–154° C. (dec.)

A mixture of 40 g. (0.224 mole) of methyl thiazole-4-carboximidate hydrochloride and 21 g. (0.224 mole) of 3-aminopyridine in 100 ml. of ethanol is stirred at room temperature for 17 hours during which time N-(3-pyridyl)-thiazole-4 - amidine hydrochloride crystallizes. The crystalline product is collected on a funnel, washed with ethanol, and dried in vacuum. Recrystallization from methanol-ether gives pure product, M.P. 223–225° C.

To a stirred solution of 26.4 g. (0.110 mole) of N-(3-pyridyl)-thiazole-4-amidine hydrochloride in 200 ml. of water containing 200 ml. of methylene chloride there is added 38.5 ml. of 2.86 M of sodium hypochlorite (0.110 mole) at room temperature over eight minutes. After ten additional minutes of stirring, the organic layer is separated and the aqueous layer extracted with 3 × 20 ml. portions of methylene chloride. The combined methylene chloride extracts are dried over sodium sulfate, filtered, and concentrated to crystalline N-chloro-N'-(3-pyridiyl)-thiazole-4- amidine hydrochloride, M.P. 93–96.5° C.

To a stirred suspension of 2.00 g. (8.38 millimoles) of N-chloro-N'-(3 - pyridyl) - thiazole-4-amidine hydrochloride in 24 ml. of 50% aqueous methanol there is added 0.98 g. (9.22 millimoles) of sodium carbonate as a saturated aqueous solution. The mixture is refluxed until the positive halogen test on potassium iodide-starch paper is negative (20 min.) after which it is cooled to room temperature, filtered, and washed with cold 50% aqueous methanol, then with water, to yield 0.39 g. of 2-(4'-thiazolyl)-4-azabenzimidazole, M.P. 304–307° C.

*Example 27*

A. A mixture of 2.45 g. (10 millimoles) of ethyl succinimidate dihydrochloride and 1.96 g. (21 millimoles) of aniline in 15 ml. of ethanol is stirred at room temperature for 20 hours. The mixture is then concentrated in vacuo to about one-half its volume. Ethane-1,2-di(N-phenylamidine) dihydrochloride of the formula

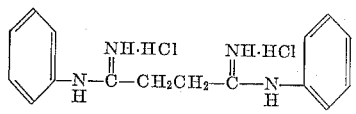

precipitates and is collected by filtration, and washed with ethanol-ether. This material is converted to α,β-di(2-benzimidazolyl) ethane of the formula

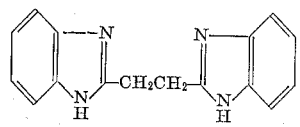

by successive treatment with sodium hypochlorite and sodium carbonate by the procedure of Example 25, but employing 2 moles of sodium hypochlorite and 2.6 moles of sodium carbonate per mole of di-amidine.

B. 2.93 g. (10 millimoles) of ethyl terephthalimidate dihydrochloride and 1.96 g. (21 millimoles) of aniline are added to 50 ml. of ethanol and the mixture stirred for 10 hours at room temperature. During this time phenylene-1,4-di(N-phenylamidine) dihydrochloride precipitates:

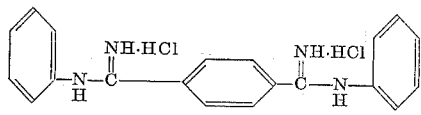

It is recovered by filtration and treated with 2 molar equivalents of sodium hypochlorite and 2.5 molar equivalents of sodium carbonate according to the method of Example 25 to give 1,4-di(2'-benzimidazolyl)benzene:

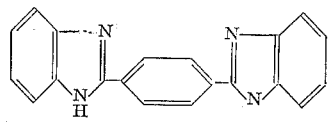

Example 28

When the process of Example 1 is repeated employing N-phenyl(furan-2-amidine)hydrochloride as starting material in place of N-phenyl(thiazole-4-amidine)hydrochloride, there is obtained N - chloro - N'-phenyl(furan-2-amidine). Treatment of this latter substance with potassium hydroxide by the process of Example 2 affords 2-(2'-furyl)benzimidazole.

Example 29

The N-halo-N'-phenyl amidines and the 2-substituted benzimidazoles set forth in the following table are prepared from the appropriate N-phenyl amidine (or acid addition salt thereof) by the procedure indicated.

aniline or a nuclearly substituted aniline with a nitrile in the presence of aluminum chloride:

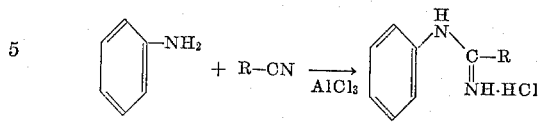

where R may be aryl, heteroaryl, aralkyl or alkyl. The details set forth below for making N-phenyl (thiazole-4-amidine) in this way may be applied to the synthesis of other N-phenyl amidines:

3.0 g. of 4-cyanothiazole (0.0275 mole) is added to 2.75 g. of aniline at 25° C., and 3.65 g. (0.0275 mole) of powdered aluminum chloride gradually stirred into the mixture over a period of 20 minutes. An exothermic reaction ensues and the temperature of the reaction mixture rises to about 120–130° C. After the addition of aluminum chloride is complete, the reaction mixture is heated at 180° C. for 20 minutes. It is then cooled to room temperature and the reaction mass dissolved in 100 ml. of 75% ethanol. The resulting solution is made strongly alkaline with 25% aqueous sodium hydroxide solution and then extracted with 3 × 70 ml. of chloroform. The chloroform extracts are combined, washed with water and dried over potassium carbonate. The chloroform solution is filtered and treated with 1.0 g. of decolorizing charcoal. The charcoal is removed by filtration and the charcoal treatment repeated once more. The resulting yellow solution is concentrated to dryness in vacuo and the residue dissolved in 25 ml. of isopropanol. The pH of the solution is adjusted to 1–1.5 with isopropanolic hydrogen chloride and 500 ml. of ether added slowly, with stirring, at about 10° C. After addition of ether is complete, the mixture is stirred for 1 hour and the resulting solid removed by filtration. The solid is washed with small portions of ether and petroleum ether and then dried in vacuo at 25° C. to give 5.7 g. of N-phenyl (thiazole-4-amidine) hydrochloride, M.P. 255–257° C.

When 2-cyanothiazole is employed in the above process, there is obtained N-phenyl(thiazole-2-amidine)hydrochloride. The N-phenylamidine derivatives of other compounds are obtained in a similar fashion by reacting the appropriate cyano compound with equimolar amounts of aniline and aluminum chloride as described above. When a 3- or 4-substituted aniline is used as starting material instead of aniline itself, the corresponding N-(3- or 4-substituted) phenylamidine is produced.

The cyano derivatives of the compound which are employed to make the starting materials for this invention are prepared from the corresponding carboxylic acid derivatives by the process exemplified below for making 4-cyanothiazole from thiazole-4-carboxylic acid:

60 g. of dry thiazole-4-carboxylic acid is added with stirring to 146 ml. of thionyl chloride. The reaction mix-

| Amidine Reactant | N-Halo Amidine | 2-Substituted Benzimidazole | Method of Example No. |
|---|---|---|---|
| N-phenyl(thiophene-3-amidine). | N-chloro-N'-phenyl-(thiophene-3-amidine). | 2(3'-thienyl) benzimidazole. | 1, 2 |
| N-phenyl(pyridine-3-amidine). | N-bromo-N'-phenyl (pyridine-3-amidine). | 2(3'-pyridyl) benzimidazole. | 3 |
| N-phenyl(pyrrole-2-amidine). | N-bromo-N'-phenyl (pyrrole-2-amidine). | 2(2'-pyrryl) benzimidazole. | 7 |
| N-phenyl butyramidine. | N-chloro-N'-phenyl buyrtamidine. | 2-propyl benzimidazole. | 8 |
| N-phenyl naphthamidine. | N-chloro-N'-phenyl naphthamidine. | 2(2'-naphthyl) benzimidazole. | 11 |

Many of the N-phenyl amidines, or acid addition salts thereof, used as starting materials in the process of our invention are described in the chemical literature. These as well as those not specifically described in the literature, may be conveniently prepared by reacting together ture is heated under gentle reflux for 2 hours. The excess thionyl chloride is then removed in vacuo, and 300 ml. of petroleum ether added slowly to the oily residue. The resulting mixture which contains precipitated thiazole-4-carboxylic acid chloride is cooled to 15° C., and the desired acid chloride removed by filtration. It is washed with cold petroleum ether and dried in vacuo, M.P. 85° C.

Approximately 14 g. of dry ammonia gas is added to a solution of 40 g. of thiazole-4-carboxylic acid chloride in 300 ml. of benzene over a period of 1 hour. The temperature is maintained at 30–35° C. The reaction mixture is then aged for 1 hour at 25° C. The solid product is removed by filtration and dried in vacuo. It is suspended in 130 ml. of cold water to dissolve ammonium chloride. The suspension is filtered and washed with cold water. The wet solid is then dissolved in 150 ml. of boiling water, the solution treated with decolorizing charcoal, filtered while hot and cooled to 5° C. The crystalline thiazole-4-carboxamide thus obtained is recovered by filtration and dried in vacuo at 40° C., M.P. 152–153° C.

24 g. of thiazole-4-carboxamide and 20 g. of phosphorus pentoxide are intimately mixed in a round bottomed flask fitted with a short condenser and a receiver. The mixture is heated in an oil bath at a bath temperature of 200–220° C. for 20 minutes. The mixture is then distilled, 4-cyanothiazole distilling at 100–120° C./20 mm. The product is purified by sublimation (65° C./30 mm.), M.P. 60–61° C.

Any departure from the above description which conforms to the present invention is intended to be included within the scope of the claims.

What is claimed is:

1. The process for making a 2-substituted benzimidazole of the formula

BZ—R where BZ represents the benzimidazole nucleus and R is selected from the class consisting of aryl, heteroaryl, aralkyl and alkyl radicals, that comprises treating an amidine of the formula $$P-\overset{H}{\underset{NH}{N}}-\overset{}{\underset{\|}{C}}-R$$

with a halogenating agent selected from the class consisting of chlorinating and brominating agents in the presence of at least an equimolar quantity of base, where P represents a phenyl group and R is as previously defined.

2. The process for making a 2-$R_1$-benzimidazole where $R_1$ is a heteroaromatic radical wherein the hetero ring contains at least two carbon atoms and the hetero atoms are selected from the class consisting of oxygen, sulfur and nitrogen, that comprises treating an amidine of the formula $$P-\overset{H}{\underset{NH}{N}}-\overset{}{\underset{\|}{C}}-R_1$$

where P represents a monocyclic aryl radical, and $R_1$ is as previously defined, with a halogenating agent in the presence of at least an equimolar quantity of base.

3. The process for making a 2-aryl benzimidazole that comprises treating an N-phenyl(arylamidine) with a halogenating agent in the presence of at least an equimolar quantity of base.

4. The process for making a 2-alkyl benzimidazole that comprises treating an N-phenyl(alkylamidine) with a halogenating agent in the presence of at least an equimolar quantity of base.

5. The process for making a 2-aralkyl benzimidazole that comprises treating an N-phenyl(aralkylamidine) with a halogenating agent in the presence of at least an equimolar quantity of base.

6. The process for preparing 2-(thiazolyl) benzimidazole that comprises treating N-phenyl(thiazoleamidine) with a halogenating agent selected from the class consisting of chlorinating and brominating agents in the presence of at least an equimolar quantity of base.

7. The process for preparing 2-(4′-thiazolyl)-benzimidazole that comprises treating N-phenyl(thiazole-4-amidine) with a halogenating agent selected from the class consisting of chlorinating and brominating agents in the presence of at least an equimolar quantity of base.

8. The process for preparing 2-(4′-thiazolyl) benzimidazole that comprises treating N-phenyl(thiazole-4-amidine) with an alkali metal hypochlorite in the presence of at least an equimolar amount of a base selected from the class consisting of alkali metal hydroxides and carbonates.

9. The process for preparing 2-(phenyl) benzimidazole that comprises treating N-phenyl(benzamidine) with a halogenating agent selected from the class consisting of chlorinating and brominating agents in the presence of at least an equimolar quantity of base.

10. The process of preparing a 2-$R_1$-benzimidazole, wherein $R_1$ is a heteroarmatic ring having at least two ring carbon atoms and as the hetero atom at least one member of the class consisting of oxygen, sulfur and nitrogen, that comprises intimately contacting an amidine of the formula $$P-\overset{H}{\underset{X}{N}}-\overset{}{\underset{\|}{C}}-R_1\\\phantom{P-N-}\underset{}{N}$$

with at least an equimolar quantity of base, where $R_1$ is as previously defined, P represents a monocyclic aryl radical, and X is selected from the class consisting of chlorine and bromine.

11. The process for making 2-thiazolyl benzimidazole that comprises intimately contacting N-halo-N′-phenyl-(thiazole-amidine) with at least an equimolar quantity of base, wherein the halo substituent is selected from the class consisting of chlorine and bromine.

12. The process for preparing 2-(4′-thiazolyl) benzimidazole that comprises intimately contacting N-chloro-N′-phenyl(thiazole-4-amidine) with at least an equimolar quantity of base.

13. The process for preparing 2-(4′-thiazolyl) benzimidazole that comprises intimately contacting N-chloro-N′-phenyl(thiazole-4-amidine) with at least an equimolar quantity of alkali metal hydroxide.

14. The process for preparing 2-(4′-thiazolyl) benzimidazole that comprises intimately contacting N-chloro-N′-phenyl(thiazole-4-amidine) with at least an equimolar quantity of alkali metal carbonate.

15. The process for preparing 2-phenyl benzimidazole that comprises intimately contacting N-chloro-N′-phenyl benzamidine with at least an equimolar amount of base.

16. The process for making a 2-substituted benzimidazole of the formula

BZ—R where BZ represents the benzimidazole nucleus and R is selected from the class consisting of aryl, heteroaryl, aralkyl and alkyl radicals, that comprises treating an amidine of the formula $$P-\overset{H}{\underset{}{N}}\diagdown\underset{NH}{\overset{}{\underset{\|}{C}}}-R$$

wherein R is as previously defined and P represents a monocyclic aryl radical, with a halogenating agent in the absence of substantial molar amounts of base to form an N-halo-N′-phenyl(R-amidine) wherein the halo substituent is selected from the class consisting of chlorine and bromine, and subsequently contacting said N-halo amidine with at least an equimolar quantity of base.

17. In the method for cyclization of an amidine of the formula

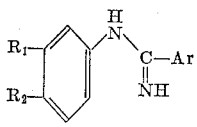

to a 2-aryl benzimidazole of the formula

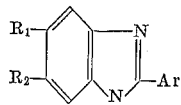

wherein Ar represents an aryl radical, and $R_1$ and $R_2$ represent a member of the class consisting of hydrogen, lower alkyl and lower alkoxy groups, the process that comprises treating said amidine with a member of the class consisting of chlorinating and brominating agents to form an N-halo amidine of the formula

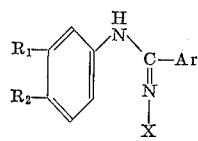

where X is selected from the class consisting of chlorine and bromine, and Ar, $R_1$ and $R_2$ are as previously defined, and intimately contacting said N-halo amidine with a base.

18. The process of preparing 2-(thiazolyl) benzimidazole from an amidine of the formula

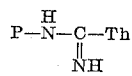

where P represents a monocyclic aryl radical and Th represents a thiazolyl ring, that comprises treating said amidine with a member of the class consisting of chlorinating and brominating agents in the absence of a substantial quantity of base to form the corresponding N-halo-N'-phenyl(thiazole-amidine), and contacting said N-halo amidine with at least an equimolar amount of base.

19. The process for preparing 2-(4'-thiazolyl) benzimidazole that comprises treating N-phenyl(thiazole-4-amidine) with hypochlorous acid to form N-chloro-N'-phenyl-(thiazole-4-amidine), and contacting said N-chloro amidine with at least an equimolar amount of a base selected from the class consisting of alkali metal hydroxides and carbonates.

20. An N-halo amidine having the formula

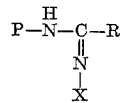

where P represents a monocyclic aryl radical, R is selected from the class consisting of alkyl, aralkyl, aryl and heteroaromatic radicals, and X is selected from the class consisting of chlorine and bromine.

21. An N-halo amidine of the formula

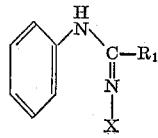

where $R_1$ is a five-membered heterocyclic ring containing at least two carbon atoms in the hetero ring and having as the hetero atoms at least one member of the class consisting of oxygen, sulfur and nitrogen, and X is selected from the class consisting of chlorine and bromine.

22. N-halo-N'-phenyl(thiazole-amidine) wherein the halo substituent is selected from the class consisting of chlorine and bromine.

23. N-chloro-N'-phenyl(thiazole-4-amidine).
24. N-chloro-N'-phenyl(thiazole-2-amidine).
25. N-bromo-N'-phenyl(thiazole-4-amidine).
26. N-chloro-N'-3-methoxyphenyl(thiazole-4-amidine).
27. N-chloro-N'-phenyl(thiadiazolyl-4-amidine).
28. A compound having the formula

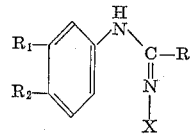

where R is a five-membered heterocyclic ring containing nitrogen and sulfur as hetero atoms, X is selected from the class consisting of chlorine and bromine, and $R_1$ and $R_2$ are selected from the class consisting of hydrogen, lower alkyl and lower alkoxy groups, at least one of $R_1$ and $R_2$ being hydrogen.

29. N-halo-N'-phenyl benzamidine, wherein the halo substituent is selected from the class consisting of chlorine and bromine.

30. An N-halo amidine of the formula

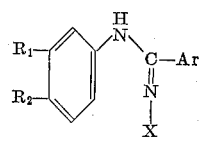

wherein Ar designates an aryl radical, X is selected from the class consisting of chlorine and bromine, and $R_1$ and $R_2$ are selected from the class consisting of hydrogen, lower alkyl and lower alkoxy groups.

31. N-chloro-N'-phenylbenzamidine.
32. N-chloro-N'-phenyl-(2-fluorobenzamidine).
33. N-halo-N'-phenyl acetamidine, wherein the halo substituent is selected from the class consisting of chlorine and bromine.
34. N-halo-N'-phenyl (phenylacetamidine), wherein the halo substituent is selected from the class consisting of chlorine and bromine.

References Cited

UNITED STATES PATENTS

| | | | |
|---|---|---|---|
| 892,900 | 7/1908 | Schraube et al. | 260—564 |
| 2,758,918 | 8/1956 | Soloway et al. | 260—564 |
| 2,942,003 | 6/1960 | Copeland | 260—302 |
| 2,994,701 | 8/1961 | Sprague et al. | 260—302 |
| 3,060,187 | 10/1962 | Carmack et al. | 260—302 |
| 3,206,468 | 10/1965 | Grenda | 260—302 |

OTHER REFERENCES

Goerdeler et al., Berichte, vol. 86 (1953), pp. 400–3.
Robin, Compt. Rend., vol. 177, pp. 1304–6.

ALEX MAZEL, *Primary Examiner.*
RICHARD J. GALLAGHER, *Assistant Examiner.*